(12) United States Patent
Yang

(10) Patent No.: US 11,699,965 B2
(45) Date of Patent: Jul. 11, 2023

(54) FAN MOTOR CONTROLLER

(71) Applicant: Global Mixed-mode Technology Inc., Hsin-Chu (TW)

(72) Inventor: Chia-Tai Yang, Hsinchu County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 353 days.

(21) Appl. No.: 17/075,641

(22) Filed: Oct. 20, 2020

(65) Prior Publication Data

US 2022/0123672 A1    Apr. 21, 2022

(51) Int. Cl.
*H02P 7/29* (2016.01)
*F04D 27/00* (2006.01)
*F04D 25/06* (2006.01)
*H02P 7/03* (2016.01)

(52) U.S. Cl.
CPC .............. *H02P 7/29* (2013.01); *F04D 25/06* (2013.01); *F04D 27/00* (2013.01); *H02P 7/05* (2016.02)

(58) Field of Classification Search
CPC ... H02P 7/29; H02P 7/05; F04D 25/06; F04D 27/00
See application file for complete search history.

(56) References Cited

U.S. PATENT DOCUMENTS

| 5,839,537 A | 11/1998 | Nishino | |
|---|---|---|---|
| 10,060,438 B2* | 8/2018 | Duan | F04D 19/005 |
| 2008/0211432 A1* | 9/2008 | Shkondin | B60L 50/52 318/140 |
| 2016/0238014 A1* | 8/2016 | Liu | F04D 19/005 |
| 2017/0067664 A1* | 3/2017 | Hu | G05B 15/02 |
| 2021/0131679 A1* | 5/2021 | Cao | F24F 1/38 |

FOREIGN PATENT DOCUMENTS

| CN | 105889109 B | 2/2018 |
|---|---|---|
| TW | 201306443 A1 | 2/2013 |

* cited by examiner

*Primary Examiner* — Zoheb S Imtiaz
(74) *Attorney, Agent, or Firm* — Winston Hsu

(57) ABSTRACT

A fan motor controller comprises a pulse width modulation signal, a switch circuit, a control unit, and a frequency judging unit. The switch circuit is coupled to a fan motor for supplying a driving current to the fan motor. The control unit generates a control signal to the switch circuit, so as to control the switch circuit. The frequency judging unit receives the pulse width modulation signal for generating a judging signal to the control unit. The pulse width modulation signal is configured to adjust a speed of a fan. The pulse width modulation signal has a frequency. Based on the frequency and a judgment rule, the fan motor controller is configured to attain the function of switching between the forward direction and the reverse direction of the fan.

11 Claims, 3 Drawing Sheets

FAN MOTOR CONTROLLER

BACKGROUND OF THE INVENTION

1. Field of the Invention

The present invention relates to a fan motor controller, and more particularly, to a fan motor controller which is capable of attaining the function of switching between the forward direction and the reverse direction of the fan by the pulse width modulation signal.

2. Description of the Prior Art

FIG. 1 is a schematic diagram showing a conventional fan motor controller 10. The fan motor controller 10 receives a voltage signal VCC, a voltage signal GND, a pulse width modulation signal PWM, a speed signal FG, and a rotation direction signal FR for driving the fan motor. The voltage signal VCC and the voltage signal GND are used for supplying the electric power to the fan motor controller 10. The pulse width modulation signal PWM is used for adjusting the speed of the fan. The speed signal FG is used for providing the speed of the fan to the system. If the system desires to attain the function of switching between the forward direction and the reverse direction of the fan, it is needed to add the rotation direction signal FR. Thus, the conventional method increases the cost of the fan and results that it is difficult to match the system with the fan motor controller 10.

SUMMARY OF THE INVENTION

According to embodiments of the present invention, a fan motor controller which is capable of attaining a function of switching between a forward direction and a reverse direction of a fan by a pulse width modulation signal is provided. The fan motor controller receives a voltage signal VCC, a voltage signal GND, the pulse width modulation signal, and a speed signal for driving a fan motor. The pulse width modulation signal is used for adjusting the speed of the fan. The fan has an original rotation direction. The fan motor controller comprises a switch circuit, a control unit, and a frequency judging unit. The switch circuit is coupled to the fan motor for supplying a driving current to the fan motor. The control unit generates a control signal to the switch circuit for controlling the switch circuit. The pulse width modulation signal has a frequency. The fan motor controller may attain the function of switching between the forward direction and the reverse direction of the fan based on the frequency. The frequency judging unit receives the pulse width modulation signal for obtaining the frequency of the pulse width modulation. Furthermore, the frequency judging unit generates a judging signal to the control unit based on the frequency, so as to inform the control unit if the rotation direction of the fan needs to be changed or not. When the judging signal is at a low level, the control unit enables the fan to operate in the original rotation direction. When the judging signal is at a high level, the control unit enables the fan to operate in a rotation direction that is different from the original rotation direction. According to different judgment rules, there are at least four embodiments as follows:

1. When the frequency is greater than a first frequency, the frequency judging unit enables the judging signal to be at the high level, and the control unit enables the fan to operate in the rotation direction that is different from the original rotation direction. 2. When the frequency is less than a second frequency, the frequency judging unit enables the judging signal to be at the high level, and the control unit enables the fan to operate in the rotation direction that is different from the original rotation direction. 3. When the frequency is greater than a third frequency and the frequency is less than a fourth frequency, the frequency judging unit enables the judging signal to be at the high level, and the control unit enables the fan to operate in the rotation direction that is different from the original rotation direction. 4. When the frequency is less than a fifth frequency or the frequency is greater than a sixth frequency, the frequency judging unit enables the judging signal to be at the high level, and the control unit enables the fan to operate in the rotation direction that is different from the original rotation direction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
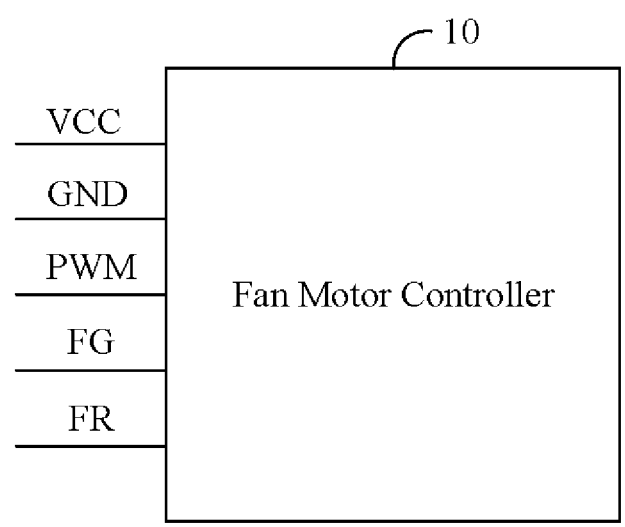
FIG. 1 is a schematic diagram showing a conventional fan motor controller.
Figure 2:
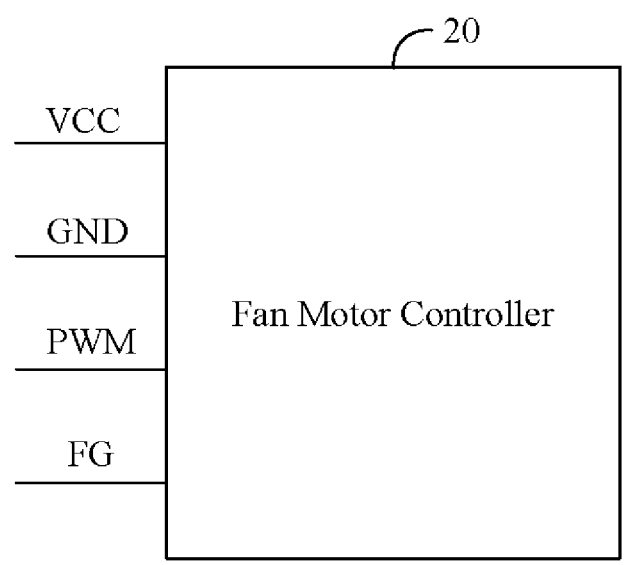
FIG. 2 is a schematic diagram showing a fan motor controller according to one embodiment of the present invention.

FIG. 2 is a schematic diagram showing a fan motor controller 20 according to one embodiment of the present invention. The fan motor controller 20 receives a voltage signal VCC, a voltage signal GND, a pulse width modulation signal PWM, and a speed signal FG for driving a fan motor M. The voltage signal VCC and the voltage signal GND are used for supplying the electric power to the fan motor controller 20. The pulse width modulation signal PWM is used for adjusting a speed of a fan. The speed signal FG is used for providing the speed of the fan to a system. The fan has an original rotation direction.

Figure 3:
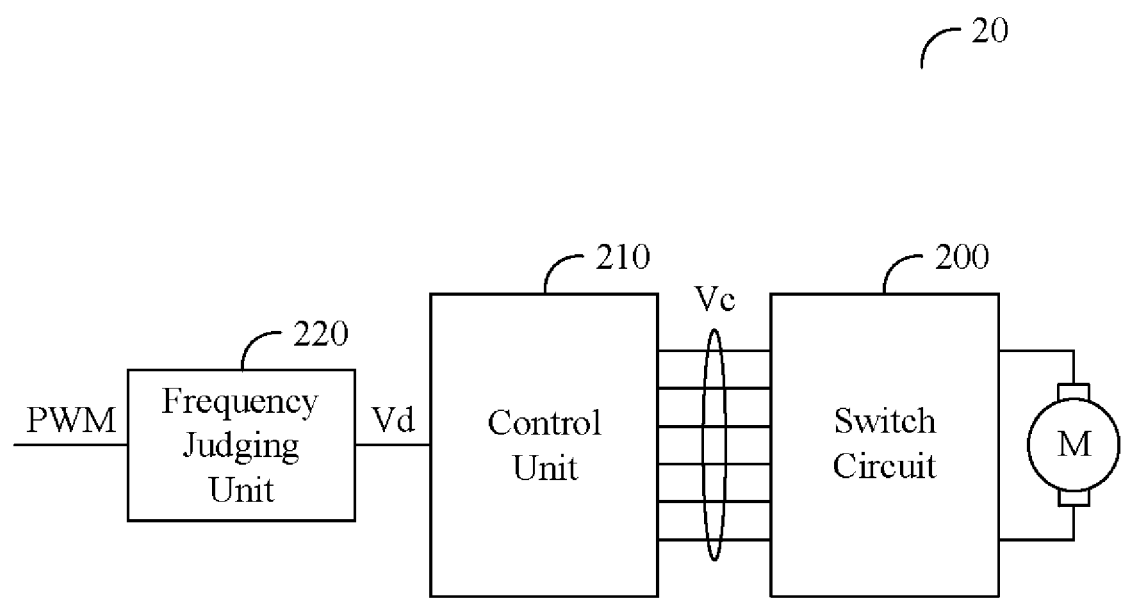
FIG. 3 is a circuit diagram showing the fan motor controller according to one embodiment of the present invention.

FIG. 3 is a circuit diagram showing the fan motor controller 20 according to one embodiment of the present invention. The fan motor controller 20 comprises a switch circuit 200, a control unit 210, and a frequency judging unit 220. The switch circuit 200 is coupled to the fan motor M for supplying a driving current to the fan motor M. The control unit 210 generates a control signal Vc to the switch circuit 200 for controlling the switch circuit 200. The pulse width modulation signal PWM has a duty cycle and a frequency. When the duty cycle approaches 1, the fan motor controller 20 may drive the fan at a full speed. The fan motor controller 20 may adjust the speed of the fan based on the duty cycle. According to one embodiment of the present invention, the fan motor controller 20 may attain a function of switching between a forward direction and a reverse direction of the fan based on the frequency. The frequency judging unit 220 receives the pulse width modulation signal PWM for obtaining the frequency of the pulse width modulation PWM. Furthermore, the frequency judging unit 220 generates a judging signal Vd to the control unit 210 based on the frequency, so as to inform the control unit 210 if the rotation direction of the fan needs to be changed or not. When the judging signal Vd is at a low level, the control unit 210 enables the fan to operate in the original rotation direction. When the judging signal Vd is at a high level, the control unit 210 enables the fan to operate in a rotation direction that is different from the original rotation direction. For example, if the original rotation direction of the fan is the forward direction and the judging signal Vd is at the high level, the control unit 210 enables the fan to operate in the reverse direction. If the original rotation direction of the fan is the reverse direction and the judging signal Vd is at the high level, the control unit 210 enables the fan to operate in the forward direction. According to different judgment rules, there are at least four embodiments as follows:

1. When the frequency is less than a first frequency, the frequency judging unit 220 enables the judging signal Vd to be at the low level, and the control unit 210 enables the fan to operate in the original rotation direction. When the frequency is greater than the first frequency, the frequency judging unit 220 enables the judging signal Vd to be at the high level, and the control unit 210 enables the fan to operate in the rotation direction that is different from the original rotation direction. 2. When the frequency is greater than a second frequency, the frequency judging unit 220 enables the judging signal Vd to be at the low level, and the control unit 210 enables the fan to operate in the original rotation direction. When the frequency is less than the second frequency, the frequency judging unit 220 enables the judging signal Vd to be at the high level, and the control unit 210 enables the fan to operate in the rotation direction that is different from the original rotation direction. According to one embodiment of the present disclosure, the first frequency may be determined independent of the second frequency. Thus, the value of the first frequency may be equal to or different from the value of the second frequency according to various requirements. 3. When the frequency is less than a third frequency or the frequency is greater than a fourth frequency, the frequency judging unit 220 enables the judging signal Vd to be at the low level, and the control unit 210 enables the fan to operate in the original rotation direction. When the frequency is greater than the third frequency and the frequency is less than the fourth frequency, the frequency judging unit 220 enables the judging signal Vd to be at the high level, and the control unit 210 enables the fan to operate in the rotation direction that is different from the original rotation direction. 4. When the frequency is greater than a fifth frequency and the frequency is less than a sixth frequency, the frequency judging unit 220 enables the judging signal Vd to be at the low level, and the control unit 210 enables the fan to operate in the original rotation direction. When the frequency is less than the fifth frequency or the frequency is greater than the sixth frequency, the frequency judging unit 220 enables the judging signal Vd to be at the high level, and the control unit 210 enables the fan to operate in the rotation direction that is different from the original rotation direction.

According to one embodiment of the present invention, the fan motor controller 20 can be applied to a three-phase fan motor. The fan motor controller 20 comprises the pulse width modulation signal PWM, the switch circuit 200, the control unit 210, and the frequency judging unit 220. The switch circuit 200 is coupled to the fan motor M for supplying the driving current to the fan motor M. The control unit 210 generates the control signal Vc to the switch circuit 200 for controlling the switch circuit 200. The frequency judging unit 220 receives the pulse width modulation signal PWM for generating the judging signal Vd to the control unit 210. The pulse width modulation signal PWM is used for adjusting the speed of the fan. The pulse width modulation signal PWM has the frequency. Based on the frequency and the judgment rule, the fan motor controller 20 attains the function of switching between the forward direction and the reverse direction of the fan. According to one embodiment of the present invention, the fan motor controller does not need a rotation direction signal FR. Thus, the cost of the fan can be reduced and it is easy to match the system with the fan motor controller 20.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fan motor controller comprising:
   a pulse width modulation signal, configured to adjust a speed of a fan, wherein the pulse width modulation signal has a frequency, and the fan has an original rotation direction;
   a switch circuit, configured to supply a driving current to a fan motor; and
   a control unit, configured to generate a control signal to the switch circuit for controlling the switch circuit, wherein the fan motor controller attains a function of switching between a forward direction and a reverse direction of the fan based on the frequency.

2. The fan motor controller of claim 1, wherein the fan motor controller further comprises a frequency judging unit, and the frequency judging unit receives the pulse width modulation signal for generating a judging signal to the control unit.

3. The fan motor controller of claim 1, wherein the fan motor controller is applied to a three-phase fan motor.

4. The fan motor controller of claim 1, wherein when the frequency is greater than a first frequency, the fan is operated in a rotation direction that is different from the original rotation direction.

5. The fan motor controller of claim 4, wherein when the frequency is less than the first frequency, the fan is operated in the original rotation direction.

6. The fan motor controller of claim 1, wherein when the frequency is less than a second frequency, the fan is operated in a rotation direction that is different from the original rotation direction.

7. The fan motor controller of claim 6, wherein when the frequency is greater than the second frequency, the fan is operated in the original rotation direction.

8. The fan motor controller of claim 1, wherein when the frequency is greater than a third frequency and the frequency is less than a fourth frequency, the fan is operated in a rotation direction that is different from the original rotation direction, and the fourth frequency is greater than the third frequency.

9. The fan motor controller of claim 8, wherein when the frequency is less than the third frequency or the frequency is greater than the fourth frequency, the fan is operated in the original rotation direction.

10. The fan motor controller of claim 1, wherein when the frequency is less than a fifth frequency or the frequency is greater than a sixth frequency, the fan is operated in a rotation direction that is different from the original rotation direction, and the sixth frequency is greater than the fifty frequency.

11. The fan motor controller of claim 10, wherein when the frequency is greater than the fifth frequency and the frequency is less than the sixth frequency, the fan is operated in the original rotation direction.

\* \* \* \* \*